Oct. 6, 1925.
J. SCHARDT
1,555,881
COLTER AND JOINTER ATTACHMENT
Filed May 11, 1925
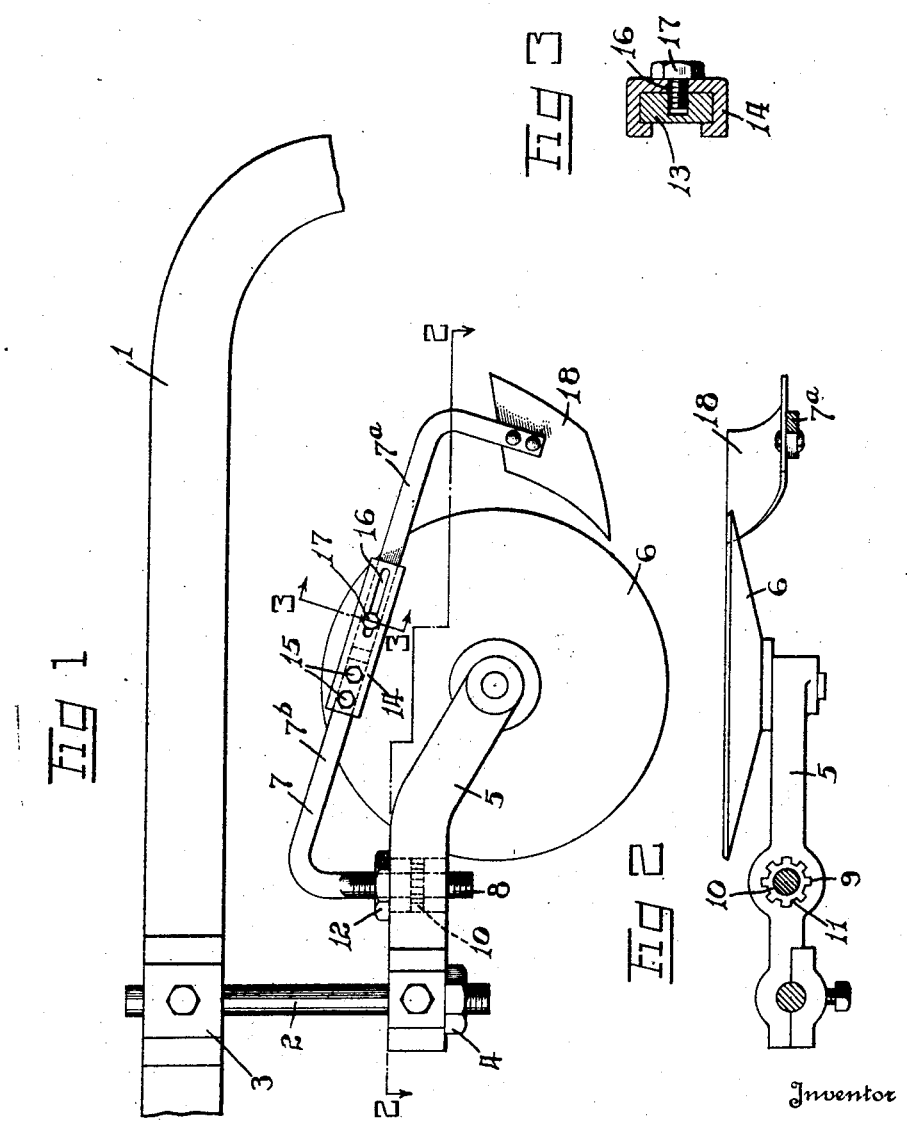
Inventor
John Schardt
By Owen, Owen & Crampton
Attorneys Patented Oct. 6, 1925.

1,555,881

UNITED STATES PATENT OFFICE.

JOHN SCHARDT, OF TOLEDO, OHIO.

COLTER AND JOINTER ATTACHMENT.

Application filed May 11, 1925. Serial No. 29,296.

*To all whom it may concern:*

Be it known that I, JOHN SCHARDT, a citizen of the United States, and a resident of Toledo, in the county of Lucas and State of Ohio, have made an invention Appertaining to a Colter and Jointer Attachment, which invention is fully set forth in the following specification.

This invention relates to improvements in colter and jointer attachments for plows, and objects of this invention are to provide a new and improved arrangement of the colter and jointer whereby liability of clogging between these parts which would interfere with the free rotation of the colter, is eliminated; and to provide an improved plow attachment having the unique features of construction, adjustment and arrangement hereinafter described.

Heretofore, as far as I am aware, jointers have been positioned at one side of and in close juxtaposition to the rolling colter, the jointer functioning to turn over sod, stubble, etc., which has previously been cut by the colter. I have discovered that almost invariably with this arrangement trash, etc., wedges between the jointer and colter and thus prevents proper rotation of the latter. Before plowing can be proceeded with, it has been necessary to clean the colter; this, of course, consumes time and is obviously a source of constant annoyance no matter how carefully an adjustment is made of the relative position of the parts.

An outstanding characteristic of my invention consists in positioning the jointer rearwardly of and in line with the rolling colter. This has proved most effective in overcoming the above mentioned difficulty and plowing can be proceeded with indefinitely without interfering with the free rotation of the colter. A further advantage of this arrangement resides in the fact that careful adjustment of the position of the jointer with relation to the colter which has been necessitated by prior constructions is eliminated.

For purposes of illustration one embodiment of the invention is shown in the accompanying drawings, in which—

Figure 1 is a side elevation of a rolling colter and jointer attached to a plow beam;

Figure 2 is a section on the line 2—2 of Figure 1; and

Figure 3 is a section on the line 3—3 of Figure 1.

The illustrated embodiment of the invention comprises a beam 1 of a plow of any usual or well known type and depending therefrom is a shaft 2 which is fixedly connected to the beam 1 by a bracket 3. Secured to the shaft 2 is a collar 4 and rotatably mounted on the shaft 2 and supported by the collar 4 is a supporting arm 5 provided with a downwardly extending outer end portion to which is connected a rolling colter 6.

Supported on the arm 5 between the axis of the colter 6 and the shaft 2 is jointer arm 7 which is provided with a screw threaded end portion 8 extending thru an opening 9 in the arm 5. Formed on the end portion 8 is an annular toothed member 10, which cooperates with teeth 11 provided on the arm 9 and projecting into the opening 10 for locking the arm 7 against lateral movement. Threaded on the end portion 8 is a lock-nut 12 and to adjust the lateral position of the arm 7, it is merely necessary to loosen the lock-nut 12, move the toothed member 10 upwardly out of engagement with the teeth 11 and turn the arm to the desired position. After proper adjustment is effected, the arm 7 is lowered and the teeth again brought into mesh, and by screwing the lock-nut 12 tightly against the arm 5 and the arm 7 will securely be held against undesired lateral displacement.

The arm 7 extends upwardly at approximately right angles to the arm 5 and then downwardly and rearwardly transversely of the colter 6, the construction enabling the arm to yield slightly in a vertical as well as horizontal plane to compensate for unusual obstructions encountered by the jointer.

To enable the length of the arm 7 to be varied, it is preferably constructed in two parts 7$^a$ and 7$^b$, the part or section 7$^a$ being flattened at one end, as indicated at 13 (Fig. 3), and extending into a channel-shaped connector 14 which is secured by bolts 15 or other suitable means to the arm section 7$^b$. Formed in the connector 14 is a longitudinally extending slot 16 through which projects a headed screw 17 which is screwed into the arm section 7$^a$. It will be apparent that by loosening the screw 17 the arm 7 may be lengthened or shortened as the conditions of service require.

The outer or rear end of the arm 7 extends downwardly and secured thereto is a jointer share 18 of usual and well known construction. The jointer 18 is positioned in line with and rearwardly of the colter 6 thereby preventing liability of sod, trash or other material wedging between the colter and jointer and permitting the colter to rotate freely at all times.

Although the construction shown and described is the best known to me at the present time, it is to be understood that numerous changes in details of construction and arrangement may be effected without departing from the spirit of the invention, especially as defined in the appended claims.

What I claim is:—

1. The combination with a supporting arm, of a rolling colter on said arm, a second arm on said supporting arm and extending rearwardly thereof transversely of said colter, a jointer carried by said second arm and arranged rearwardly thereof and in line with said colter, means including telescoping members for permitting length adjustment of said jointer arm, and means including intermeshing toothed members for permitting lateral adjustment of the jointer relatively to said colter.

2. The combination with a supporting arm of a rolling colter on said arm, an extensible arm on said support extending rearwardly thereof transversely of said colter, said arm consisting of two sections, a flattened end portion on the end of one section, a channel-shaped connector on the adjacent end of the other section to receive said flattened end portion, said connector having a longitudinal slot, a screw projecting into said slot for securing said sections together, and a jointer carried by said extensible arm and arranged rearwardly thereof and in line with said colter.

3. The combination with a supporting arm of a rolling colter on said arm, an extensible arm on said support extending rearwardly thereof transversely of said colter, said arm consisting of two sections, a flattened end portion on the end of one section, a channel-shaped connector on the adjacent end of the other section to receive said flattened end portion, said connector having a longitudinal slot, a screw projecting into said slot for securing said sections together, a jointer carried by said extensible arm and arranged rearwardly thereof and in line with said colter, and an annular toothed member on said extensible arm, said supporting arm having an opening provided with teeth adapted to mesh with the teeth in said toothed member thereby to permit lateral adjustment of the jointer relatively to the colter.

In testimony whereof, I have hereunto signed my name to this specification.

JOHN SCHARDT.